United States Patent Office 3,492,400
Patented Jan. 27, 1970

3,492,400
**ORAL IMMUNIZATION OF SALMONIDS AGAINST FURUNCULOSIS, AND ALUM-PRECIPITATED *AEROMONAS SALMONICIDA* ANTIGENIC FRACTION THEREFOR**
George W. Klontz, Bothell, Wash., assignor to the United States of America as represented by the Secretary of the Interior
No Drawing. Filed Mar. 22, 1968, Ser. No. 715,187
Int. Cl. A01k *61/00;* A61k *23/00;* C12k *5/00*
U.S. Cl. 424—92                     18 Claims

ABSTRACT OF THE DISCLOSURE

An antigenic composition which provides oral immunization of salmonids against furunculosis disease is produced by inoculating a culture medium with *Aeromonas salmonicida*, extracting toxin produced by the cell culture and rendering the toxin non-injurious to fish while retaining its antigenic properties.

This invention resulted from work done by the Bureau of Sport Fisheries and Wildlife of the Department of the Interior, and the domestic title to the invention is in the Government.

BACKGROUND OF THE INVENTION

Furunculosis is a disease of trout and salmon caused by *Aeromonas salmonicida*, a gram negative, non-motile rod bacterium. The disease is usually described as a generalized bacteremia with focal lesions occurring in frequently in the skeletal muscles. Such focal lesions are associated with the subacute and chronic disease and are rarely seen in the acute form. The lesions are filled with a reddish, opaque fluid and frequently drain through the skin leaving a ragged-edged ulcer; hence the name "furunculosis." Infection is thought to be by oral ingestion, through a mechanical break in the skin, or both.

The disease was first reported in the United States in 1902. Since then it has been reported in virtually all artificially propagated populations and some wild populations of salmon and trout. At times epizootics have threatened the very existence of fish culture. Today the disease is enzootic in many hatcheries but outbreaks can be controlled by drug therapy.

There have been a number of attempts to orally immunize trout and salmon against furunculosis. The first was by D. C. B. Duff in 1942 and reported in J. Immunol. 44 (1): 87–94. Duff used a chloroform-killed preparation as the antigen. He reported a moderate amount of success: 25% survival in the non-immunized group as compared to 75% survival in the immunized group.

In 1949, S. F. Snieszko et al. (Prog. Fish-Culturist 11 (3): 161–169) attempted to control furunculosis both by oral immunization using a heat-killed preparation as the antigen and by treatment with sulfamerazine. They concluded that sulfamerazine treatment afforded better survival than did the oral immunization. Krantz et al., in 1964 (Prog. Fish-Culturist 26 (2): 63–69) tried two preparations for oral immunization. One was untreated living cells and the other was similar to that used by Duff. They concluded that their techniques were unsatisfactory to induce specific immunity by oral administration of the vaccine.

Finally, Spence et al. in 1965 fed formalin-killed organisms to juvenile fish and compared the efficacy of this technique with that of passive immunization; i.e. injection of exposed fish with immune serum made in another animal. Spence et al. state, that with the exception of temperature, conditions affecting the formation of antibodies in fish can be assumed to be the same as those in other animals; the temperatures favoring rapid antibody production being near the upper limits tolerated by cold water fishes. They concluded that passive immunization provided better portection than did oral immunization. This work was reported in Canad. J. Micro. 11: 397–405.

This invention comprises an antigenic composition useful for oral immunization of salmonids against furunculosis disease, a method of preparing the antigen and a method for administering the antigenic composition to fish.

Accordingly, it is an object of this invention to provide an orally-administered, antigenic composition for the immunization of salmonids against furunculosis disease.

Another object of this invention is to provide a method for the preparation of an antigenic material.

A further object of this invention is to provide a method for the oral immunization of salmonids against *Aeromonas salmonicida*.

DESCRIPTION OF THE INVENTION

In an investigation of the pathogenesis of furunculosis in rainbow trout, it was discovered that the disease was initiated in the fish by a very potent toxin found in the bacterial cell wall. Severe mechanical disruption of the bacterial cells serves to release the toxin. Alum precipitation has been found to render the toxin non-injurious to fish while retaining its antigenic properties.

Antigenic material prepared in this manner may be conveniently administered to hatchery-reared salmonids by mixing the material with feed. Dosage levels required to provide a high degree of immunization are extremely small. Significant protection against furunculosis has been attained at total dosage levels as low as about 30 micrograms per fish administered in feed over a period of several weeks. A dosage level of about 100 micrograms per fish represents about the practical minimum immunizing dosage for fingerling salmonids. Increasing the dosage to a level 3 to 5 times that of the minimum immunizing level produces no injurious results.

The following examples of the preparation and administration of the antigenic material serve to more fully describe and characterize its production and use.

EXAMPLE 1

A quantity of oral immunizing agent was prepared by the following procedure:

A culture medium was innoculated with a 24–36 hour broth culture of *Aeromonas salmonicida* isolated from fish which had died of furunculosis. The inoculated culture was incubated for 40–44 hours at room temperature (20–22° C.) with aeration. After incubation, the cells were harvested by continuous flow centrifugation at 2–4° C.

The wet packed cells recovered from the centrifugation step were suspended in 4–5 times their weight of demineralized water and subjected to ultrasonic disruption at 4° C. until very few intact cells remained. Cell debris was then separated from the supernatant fluid by centrifugation at 4° C. A volume of 5% aqueous potassium alum (potassium aluminum sulfate) equal to the volume of supernatant fluid was then added with stirring at room temperature.

The pH of the supernatant fluid-potassium alum mixture was then adjusted to 7.0 by dropwise addition of sodium hydroxide to form a precipitate of the antigenic material. Separation of the precipitate was accomplished by centrifugation at 4° C. The precipitate was washed three times with demineralized water; each washing followed by centrifugation. Drying of the washed precipitate was accomplished at −10° C. at 15–25 microns Hg pressure. The freeze-dried precipitate is stable and may be stored in sealed containers at room temperature until use.

In this example trypticase-soy broth, which is a standard, commercially available bacteriological medium, was used as the culture medium. Other similar culture mediums which supply the metabolic requirements of the *Aeromonas bacterium* may be substituted for trypticase-soy broth. A shaker table was used to provide aeration but other aeration methods may be employed.

Cell disruption may be accomplished by ultrasonic disruption as in the example or may be achieved by grinding with glass beads in a high-speed homogenizer, by electromagnetic vibration or by other similar techniques.

It is important that the procedure from harvesting the cells from the broth through centrifugation of the disrupted cell mixture be accomplished without delay between the steps. Delays at any stage of those steps can result in significant losses in potency of the antigenic product. Likewise, it is important that the pH adjustment be carefully performed so as to insure uniformity and potency of the final product.

EXAMPLE 2

Antigenic material prepared by the process set out in Example 1 was evaluated in the following test. In a fish hatchery, fingerling coho salmon were separated into six groups. Four of the groups were administered antigenic material mixed with their food while the remaining two groups served as controls.

About six weeks after the experiment began, a natural epizootic of furunculosis occurred and persisted sporadically for about the next nine weeks. The results of the test are set out in the following table:

TABLE 1

| Group | Number of fish | Total antigen dosage (micrograms) | Mortality due to Furunculosis (percent) |
| --- | --- | --- | --- |
| 1 | 150 | 380 | 0 |
| 2 | 150 | 350 | 0 |
| 3 | 150 | 340 | 0.7 |
| 4 | 150 | 160 | 0.7 |
| 5 (control) | 150 | 0 | 22.2 |
| 6 (control) | 2,000 | 0 | 34.9 |

As may be seen from the table, dosage of about 160 micrograms per fish or greater afforded almost complete protection against the disease.

EXAMPLE 3

The antigenic material produced by the process set out in Example 1 was further evaluated in a large scale, low-dosage test. In this test, 6 ponds containing 60,000 fingerling coho salmon each were used as test ponds while 6 additional ponds each again containing 60,000 fingerling coho salmon, were used as control ponds. The test and control ponds were arranged alternately.

Antigenic material mixed in feed was administered to the fish in each of the test ponds. The antigenic material was fed over a 49-day period for a total equivalent dosage of 33 micrograms per fish. Four of the 6 ponds in both the test and control groups also received a therapeutic dosage of a broad spectrum, non-specific, nitrofuran-type antibiotic. During the 20-week observation period, there were two clinically distinct epizootics of furunculosis. The first occurred during the 9th week and lasted approximately 3 weeks. The second occurred during the 14th week and persisted for 5 weeks. Results of the test are summarized in the following table:

TABLE 2

| Group | Type | No. of ponds | Antibiotic | Antigen | Furunculosis mortality (percent) Average | Range |
| --- | --- | --- | --- | --- | --- | --- |
| 1 | Test | 4 | Yes | Yes | 5.6 | 2.5–9.4 |
| 2 | do | 2 | No | Yes | 5.2 | 2.4–8.1 |
| 3 | Control | 4 | Yes | No | 8.0 | 4.6–15.4 |
| | do | 2 | No | No | 11.4 | 4.6–18.2 |

Analysis of the results showed the antigen significantly reduced the mortality rate due to furunculosis. Use of an antibiotic in conjunction with the antigen did not appear to have any effect. Incidence of the disease in the test groups was influenced by the low dosage level. Dosage of 33 micrograms per fish was approximately one-third of the minimum immunizing dosage calculated from other studies.

It will be understood that the present invention is not limited to the particular embodiments or methods described but embraces all such modified forms as may come within the scope of the following claims.

What is claimed is:

1. A process for preparing an antigenic material for the oral immunization of salmonids against furunculosis disease comprising the steps of:
   (a) inoculating a bacteriological culture medium supplying the metabolic requirements of the *Aeromonas bacterium* with *Aeromonas salmonicida* isolated from fish infected with furunculosis;
   (b) incubating said inoculated culture for a period of time sufficient to produce substantial numbers of bacterial cells;
   (c) removing said cells from the culture medium;
   (d) disintegrating said cells by severe mechanical disruption sufficient to release an antigen material found in the bacterial cell wall to produce a disrupted cell debris suspension and a supernatant antigen material containing fluid;
   (e) separating said supernatant antigen material containing fluid from said disrupted cell debris suspension;
   (f) alum precipitating an antigenic fraction from said supernatant antigen material containing fluid in order to thereby render the antigenic fraction non-injurious to fish while retaining its antigenic properties, and
   (g) recovering said alum precipitated antigenic fraction from said supernatant fluid with the further proviso that steps (c) to (e) be accomplished without delays between steps sufficient to result in significant losses in potency of the antigenic product.

2. The process of claim 1 wherein said antigenic fraction is precipitated from said supernatant antigen material containing fluid by treatment with an aqueous alum solution.

3. The process of claim 2 wherein said alum solution comprises potassium aluminum sulfate.

4. The process of claim 3 wherein said precipitation is performed at a pH of 7.0.

5. The process of claim 1 wherein the steps of removing said cells from the culture medium, disintegrating said cells and separating a supernatant antigen material containing fluid from said disrupted cell suspension are carried out sequentially and without delay between the steps.

6. The process of claim 1 wherein said recovered precipitated antigenic fraction is further processed by freeze drying.

7. The process of claim 5 wherein said steps of removing cells from said culture medium and separating said disrupted cell suspension from supernatant antigen material containing fluid are performed by refrigerated centrifugation.

8. The process of claim 7 wherein said alum solution comprises potassium aluminum sulfate and wherein said precipitation is performed at a pH of 7.0.

9. The process of claim 1 wherein said disintegration step is performed by ultrasonic disruption.

10. The process of claim 1 wherein said incubation step is performed at room temperature under aerating conditions.

11. The process of claim 1 wherein said culture medium comprises trypticase-soy broth.

12. An alum-precipitated, *Aeromonas salmonicida* antigenic fraction produced by the process of claim 1.

13. An alum-precipitated, *Aeromonas salmonicida* antigenic fraction produced by the process of claim 8.

14. A process for the immunization of salmonids against furunculosis disease which comprises orally administering to said salmonids immunologically effective amounts of an alum-precipitated, *Aeromonas salmonicida* antigenic fraction produced by the process of claim 1.

15. The process of claim 14 wherein said salmonids comprise hatchery-reared salmon and trout.

16. The process of claim 15 wherein said immunologically effective amount is greater than about 100 micrograms per fish.

17. The process of claim 16 wherein said antigenic composition is admixed with food normally supplied to said fish.

18. The process of claim 14 wherein said antigenic composition is produced by the process of claim 8.

References Cited

Duff J. Immunol 44(1):87–94 May 1942 "The Oral Immunization of Trout Against Bacterium Salmonicida."

Sniesko et al. Prog. Fish-Culturist 11(3):161–169 July 1949 "Prophylaxis of Furunculosis in Brook Trout (*Salvelinus fontinalis*) by Oral Immunization and Sulfamerazine."

Kranz et al. Prog. Fish-Culturist 26(2):65–69 April 1964 "Immune Response of Trout to Aeromonas Salmonicida. Part II. Evaluation of Feeding Techniques."

Spence et al. Canad. J. Microbiol. 11(3):397–405 June 1965 "Active and Passive Immunization of Certain Salmonid Fishes Against Aeromonas Salmonicida."

S. K. ROSE, Primary Examiner

U.S. Cl. X.R.

119—3; 195—1.8, 100, 102